(12) United States Patent
Miller et al.

(10) Patent No.: US 10,311,394 B2
(45) Date of Patent: *Jun. 4, 2019

(54) SYSTEM AND METHOD ANALYZING BUSINESS INTELLIGENCE APPLIED TO PHYSICAL ASSETS AND ENVIRONMENT FACTORS

(71) Applicant: Roundhouse One LLC, San Francisco, CA (US)

(72) Inventors: Mark R. Miller, San Francisco, CA (US); Natan Goore, San Francisco, CA (US); Signo Uddenberg, San Francisco, CA (US); Ethan Crowther, San Francisco, CA (US)

(73) Assignee: Roundhouse One LLC, San Francisco, CA (US)

(*) Notice: Subject to any disclaimer, the term of this patent is extended or adjusted under 35 U.S.C. 154(b) by 716 days.

This patent is subject to a terminal disclaimer.

(21) Appl. No.: 15/052,096

(22) Filed: Feb. 24, 2016

(65) Prior Publication Data

US 2016/0253614 A1 Sep. 1, 2016

Related U.S. Application Data

(63) Continuation-in-part of application No. 14/310,759, filed on Jun. 20, 2014, which is a continuation-in-part of application No. 14/310,785, filed on Jun. 20, 2014.

(Continued)

(51) Int. Cl.
*G06Q 10/00* (2012.01)
*G06Q 10/06* (2012.01)

(52) U.S. Cl.
CPC ....... *G06Q 10/06395* (2013.01); *G06Q 10/00* (2013.01)

(58) Field of Classification Search
CPC ... G06Q 10/00; G06Q 10/06395; G06Q 10/06
(Continued)

(56) References Cited

U.S. PATENT DOCUMENTS

2011/0066401 A1* 3/2011 Yang .................. G01J 1/4228
702/184

OTHER PUBLICATIONS

Ouertani, Parlikad, McFarlane, Towards an Approach to Select an Asset Information Management Strategy, 2008, International Journal of Computer Science and Applications, vol. 5, No. 3b, pp. 25-44 (Year: 2008).*

* cited by examiner

*Primary Examiner* — Hafiz A Kassim
*Assistant Examiner* — Zahra Elkassabgi
(74) *Attorney, Agent, or Firm* — Paul Davis

(57) ABSTRACT

A method is for analyzing business intelligence applied to at least one of physical assets and environment factors. A computing system is used that includes one or more processors of a data management system for at least one stream of data selected from at least one of physical assets and environment factors. A data transformer is used to transform data from the at least one stream of data to their item and attribute characterizations. One or more analytic engines are used to receive the items with their attributes from the data management system and provide multi-dimensional analysis relative to a scale of study for at least one physical asset and environmental factor. Multi-dimensional analysis is defined as analysis that compares, calculates, correlates, or operates on items and/or attributes from at least two distinct dimensions. The one or more analytic engines are used to provide one or more outputs of processed and correlated data that is sent to an analysis qualifier to determine a quality of analysis. A data analysis evaluator is used to determine a (Continued)

quality score for information generated by the analytic engine.

20 Claims, 16 Drawing Sheets

Related U.S. Application Data

(60) Provisional application No. 61/974,035, filed on Apr. 2, 2014.

(58) Field of Classification Search
USPC .................................... 705/7.38, 7.39, 7.41
See application file for complete search history.

SYSTEM CLOUD-SERVER STRUCTURE

EXTERNAL SOURCE DATA

DETAILED PLATFORM OVERVIEW

ETL FLOW DIAGRAM

DATA WAREHOUSE

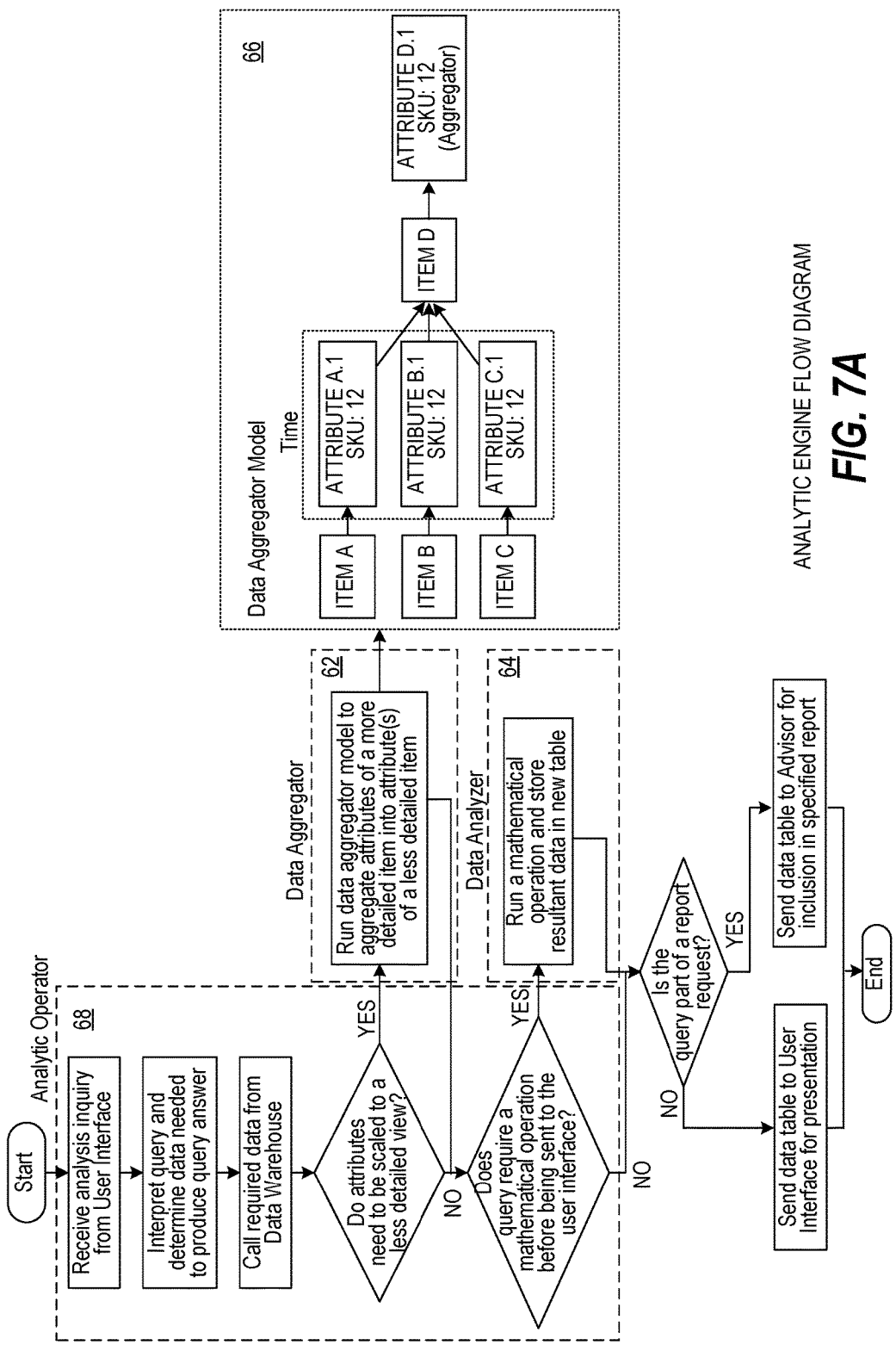
FIG. 7A  ANALYTIC ENGINE FLOW DIAGRAM

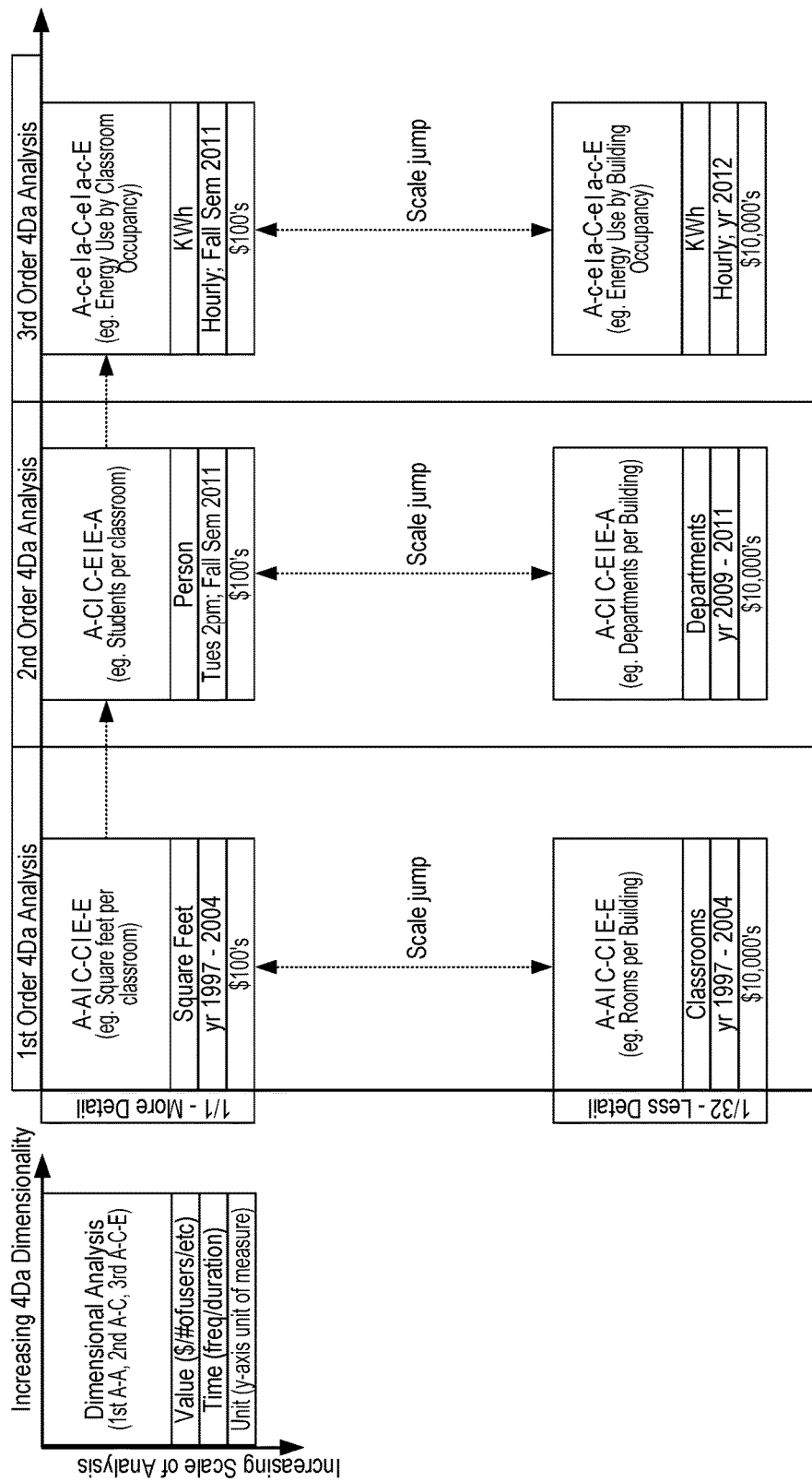

1st ORDER VENN DIAGRAM

2nd ORDER VENN DIAGRAM

3rd ORDER VENN DIAGRAM

TIME & VALUE VENN DIAGRAM

DATA ANALYSIS EVALUATOR

ADAPTIVE INTELLIGENCE

SYSTEM AND METHOD ANALYZING BUSINESS INTELLIGENCE APPLIED TO PHYSICAL ASSETS AND ENVIRONMENT FACTORS

CROSS-REFERENCE TO RELATED APPLICATIONS

This application claims priority to, which is a Continuation in Part of patent application Ser. No. 14/310,759, filed Jun. 20, 2014, which is a Continuation in Part of patent application Ser. No. 14/310,785, filed Jun. 20, 2014, which is a Continuation in Part of Provisional Patent Application No. 61/974,035, filed Apr. 2, 2014, which is a Continuation in Part of U.S. patent application Ser. No. 14/053,927, filed Oct. 15, 2013, which is a Continuation in Part of U.S. patent application Ser. No. 13/586,520, filed Aug. 15, 2012, which is a Continuation of U.S. patent application Ser. No. 13/586,529, filed Aug. 15, 2012, now U.S. Pat. No. 8,571,909, issued Oct. 29, 2013, which is a Continuation in Part of U.S. Provisional Patent Application No. 61/524,422, filed Aug. 17, 2011.

BACKGROUND

Field of the Invention

The invention relates generally to energy information and analytic tools and more particularly to a data system for applying business intelligent to physical assets and environmental factors.

Description of Related Art

Currently, business leaders managing "build asset"/facilities portfolios often make mission-critical decisions using: 1) no data, 2) the wrong data, or 3) inaccurate data. Vendors nominally in this space include: business intelligence developers, consultants, integrated workplace management system vendors, computer-aided facilities management systems providers and others. Clients can use technology and services to optimize efficiency around a wide variety of facilities related business problems, from project management to lease administration to space utilization and occupancy. These offerings, however, are standardized and afford the client only limited ability to customize them. Moreover, they are designed for and constrained by the organizational "silo" in which they reside.

Existing systems specify the data requirements based on the data's expected relationship to a type of outcome or discrete task (i.e., $$energy efficiency, lease administration, etc.). Where the outcomes are multi-dimensional, the data points within those dimensions are ill defined. The client "value" set is often predefined and solving for non-standard or multi-dimensional definitions of value is not supported. For example, available tools fail to provide built asset portfolio planning tools that allow an education client to solve for their own definition of value, i.e., maximum teacher retention against declining CapEx and contracting building inventory. In short, no existing analytics engine correlates asset-related (A), resources/environment-related (E) and culture-related (C) data over time (T) to illustrate current performance, optimum performance and/or benchmark performance.

Accordingly, there exists a need for modern, on-demand technology to extract, classify, validate, qualify, analyze, store, enhance and display data related to multi-dimensional enterprise decision making with adjustable value definitions. There is a further need to provide systems and methods that take an actuarial approach to predictive modeling related to human performance, resource utilization/environmental factors and architectural data. Optimal performance is dependent on hundreds (if not thousands) of factors, many of which are E/C/A/T dependent. The complexity of these interactions and correlations calls for powerful methodologies and technology to provide insight and the basis for action.

Accordingly, there is a need for improved data systems, and their methods of use, for qualifying and analyzing data for at least one business intelligence. There is a further need for data systems, and their methods of use, for qualifying and analyzing data for at least one business intelligence that uses multi-dimensional analysis relative to a scale for at least one business intelligence.

SUMMARY

An object of the present invention is to provide systems and methods for analyzing business intelligence applied to at least one of physical assets and environment factors.

An object of the present invention is to provide systems and methods for analyzing business intelligence applied to at least one of physical assets and environment factors using a computing system that includes one or more processors of a data management system for at least one stream of data selected from at least one of physical assets and environment factors.

An object of the present invention is to provide systems and methods for analyzing business intelligence applied to at least one of physical assets and environment factors using one or more processors to provide multi-dimensional analysis of the at least one stream of data for at least one of, environmental resources, the impacts of environmental resources and the impacts on physical assets.

An object of the present invention is to provide systems and methods for analyzing business intelligence applied to at least one of physical assets and environment factors using one or more processors to correlate data from the multi-dimensional analysis.

These and other objects of the present invention are achieved in a method for analyzing business intelligence applied to at least one of physical assets and environment factors. A computing system is used that includes one or more processors of a data management system for at least one stream of data selected from at least one of physical assets and environment factors. A data transformer is used to transform data from the at least one stream of data to their item and attribute characterizations. One or more analytic engines are used to receive the items with their attributes from the data management system and provide multi-dimensional analysis relative to a scale of study for at least one physical asset and environmental factor. Multi-dimensional analysis is defined as analysis that compares, calculates, correlates, or operates on items and/or attributes from at least two distinct dimensions. The one or more analytic engines are used to provide one or more outputs of processed and correlated data that is sent to an analysis qualifier to determine a quality of analysis. A data analysis evaluator is used to determine a quality score for information generated by the analytic engine.

In another embodiment a system includes at least one processor and a memory storing instructions that, when executed by the at least one processor, cause the system to perform: selecting a set of signal inputs relating to a plurality of energy usage conditions; determining input values for at least a portion of the plurality of sensors; and applying multi-dimensional analysis to the input values to identify energy usage conditions associated with non-technical loss.

In another embodiment of the present invention a method qualifies and analyzes business intelligence applied to physical assets and environment factors. One or more processors of a data management system are used with a plurality of stream of source data and to receive first and second streams of source data. The first stream of data is client provided energy management physical assets and the second stream is data directed to environmental resources relating to energy management or usage. One or more processors are used to organize the first and second streams of data according to their associated items and attributes. The one or more processors are used to provide multi-dimensional analysis of the at least one stream of data for environmental resources, or the impacts of environmental resources on physical assets for at least one business intelligence that is defined as contributing insight into the impacts of physical assets on energy management or usage, the one or more processors taking a progression of complexity of analysis and findings as inputs of a first order to produce an output and is tags by scale and attribute. The first order of analysis is available as inputs for second order analysis that become outputs which are summarized. The one or more processors are used to correlate data from the multi-dimensional analysis using user-inputted priorities. The one or more processors are used for a data analysis evaluator of the analytic engine to communicate with the client to determine relevance of the analyzed data to question business intelligence. The one or more processors use business intelligence as improved knowledge about a business problem or a study criteria to make an informed decision. A feedback loop is applied to compare the analyzed data to peer or public benchmarks or trends and includes an intelligence logic that receives updated data and associates this updated data with data in the data warehouse for use by the analytic.

BRIEF DESCRIPTION OF DRAWINGS

FIG. 5(*a*) is an embodiment of the present invention illustrating the internal processes of the system's ETL.

FIG. 7(*a*) is an embodiment of the present invention illustrating the internal processes of the analytic engine.

FIG. 7(*b*) is an embodiment of the present invention illustrating a chart representing the system's analysis logic by dimension and scale.

FIG. 7(*c*) is an embodiment of the present invention illustrating a Venn diagram illustrating 1.sup.st order analysis logic.

FIG. 7(*d*) is an embodiment of the present invention illustrating a Venn diagram illustrating 2.sup.nd order analysis logic.

FIG. 7(*e*) is an embodiment of the present invention illustrating a Venn diagram illustrating 3.sup.rd order analysis logic.

FIG. 7(*f*) is an embodiment of the present invention illustrating a Venn diagram with respect to time and value.

DETAILED DESCRIPTION

Figure 1:
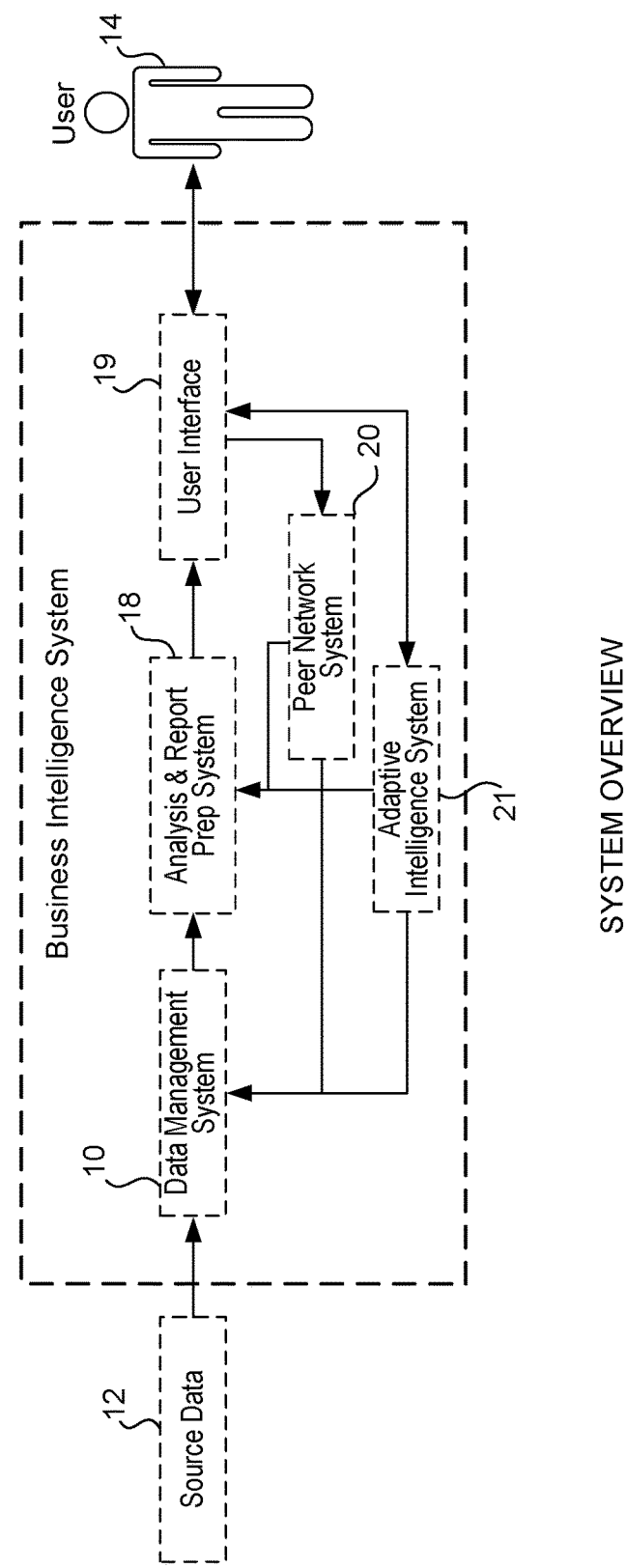
FIG. 1 is an embodiment of the present invention illustrating the positioning of the business intelligence system relative to incoming data and client services.
Figure 2:
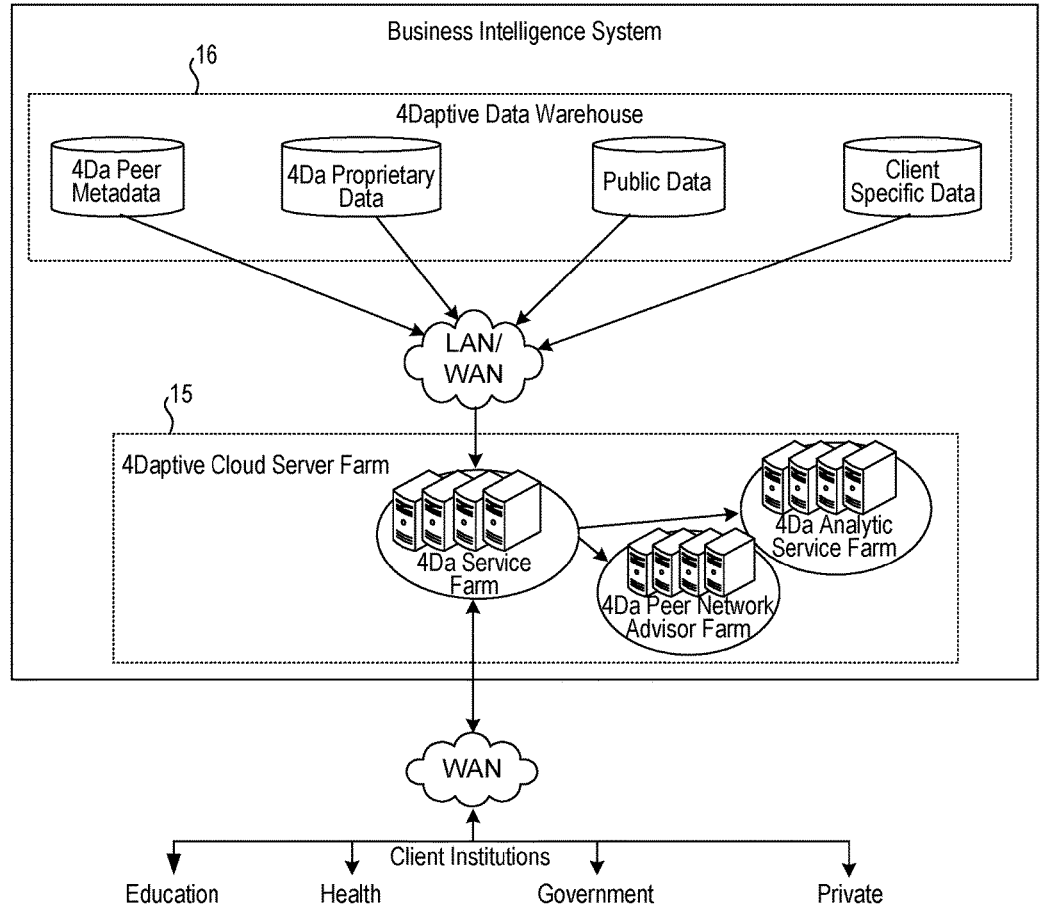
FIG. 2 is an embodiment of the present invention illustrating the primary stages of the system.

Referring to FIGS. 1 and 2, in one embodiment of the present invention, a data management system 10 and analysis and report preparation system 18 are provided for qualifying and analyzing data for at least one business intelligence. As a non-limiting example, the business intelligence includes but is not limited to occupancy and utilization optimization at an academic facility looking to understand the financial impact of an expansion in its enrollment. A platform is provided that receives source data. In one embodiment, the source data can be three streams of data. The first, second and third streams of data can be client source data, public source data and data acquired by the data management system 10. The data management system 10 transforms raw data and stores it.

The analysis and report preparation system 18 includes an analytic engine. In operation, the data management system 10 receives first, second, and third streams of source data, the first stream of data being client source data, the second stream of data being public source data and the third stream being data acquired by the data management system. The data management system 10 organizes the first, second and third streams of data into items and their attributes. Examples of item and attribute types include but are not limited to, items: classroom, building, individual person, department, window, temperature sensor, site, city, and the like; attributes: size/quantity, orientation/location, identity characteristics, material composition, construction/implementation process, maintenance characteristics, measurement values, and the like.

Furthermore, the data management system 10 classifies the items and attributes as belonging to at least one of the following dimensions: asset, culture, environment, time, and value. The analytic engine receives the items with their attributes from the data management system and applies logic to provide single and multi-dimensional analysis relative to a scale of study for at least one business intelligence. Multi-dimensional analysis is defined as analysis that compares, calculates, correlates, or otherwise operates on items and/or attributes from at least two distinct dimensions, while uni-dimensional analysis refers to the same operations within a single dimension. Scale is defined as the level of detail of the particular analysis relative to the dimension under study. As a non-limiting example of scale, a high-detail study for a school may be at the room level, while a less-detail study may be at the building level. Dimensions can have unlimited levels of scale.

FIG. 1 is a block diagram illustrating an overview of the data management system 10 functional stages relative to source data 12, external source data and the client 14. The external source data 12 can be inputted into the data management system 10 manually or automatically. The external source data 12 can be imported to a data warehouse 16, assigned, associated, classified, scaled, validated, and archived for future use. The source data 12 is then combined with internal source data (data from previous projects) and received at an analysis and report preparation function 18 for analytical interpretation, modeling, and report prep. This information continues to a user interface 19 for graphic display, query navigation, and report output. Additionally, client peer related information can be provided to the system through a peer network system 20 and used to provide report context by a peer network advisor. Feedback from the platform circulates back into the data management system 10 through an adaptive intelligence 21. This information is formalized and used to refine the data management system 10 operations.

FIG. 2 is a diagram of the overall system showing how it uses cloud-based servers to both store data and conduct analysis operations. In one embodiment, the client 14, or a service team member, uploads data from various sources to a data management system cloud server farm 15 using a data management system user portal, via user interface 19, accessible on any compatible device and it can be connected to a network, including but not limited to a wide area network (WAN). The cloud farm 15 transforms raw data into a format usable by the data management system 12 and passes it to the data management system warehouse 14 via a WAN/LAN (local area network). Data from pre-determined sources may be directly accessed and used by the data management system 10 and platform via developed application programming interfaces (APIs).

The overall system also includes: analysis and report preparation logic 18; a user interface 19 that a user uses to interact with the data management system 10, a peer network 20 and adaptive intelligence 21.

Figure 3:
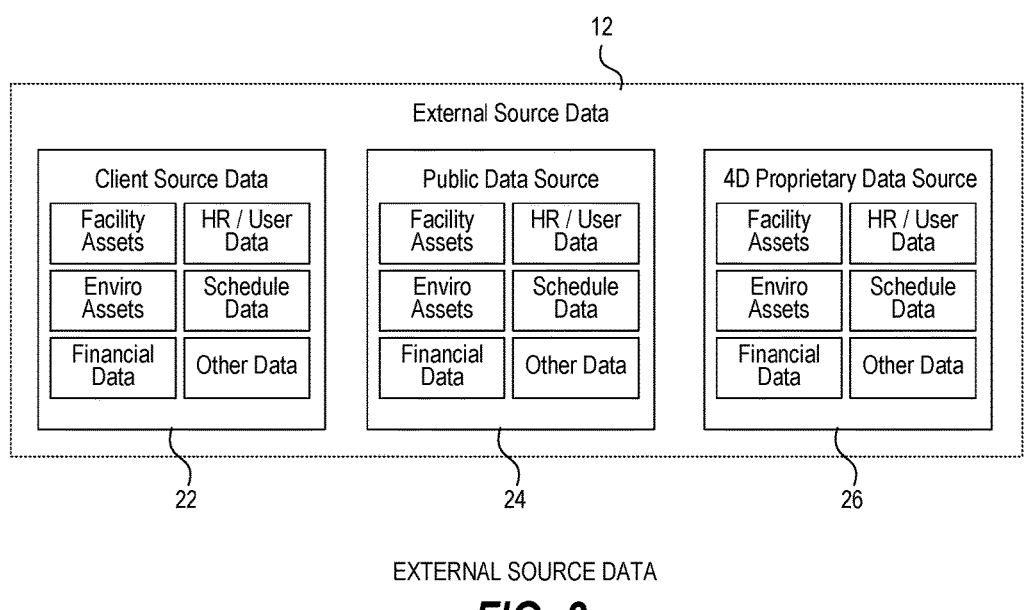
FIG. 3 is an embodiment of the present invention illustrating the system components and the flow of data and information through the platform.

As illustrated in FIG. 3, the client source data 22 is data provided by a client, or secured from the client by others but is owned by the client, and is specific to that client. The client source data 22 can be related to at least one: facility assets; human factors; cultural factors; user data; environmental resource data; scheduling data; financial data; custom data, and the like.

The public source data 24 is data accessed from public resources such as public federal government records, local city planning databases, public utility records, census records, university sponsored research, publicly released business indices, and the like. The public source data can be data related to at least one: facility assets; human factors; cultural factors; user data; environmental resource data; scheduling data; financial data; custom data and the like.

The data management system proprietary data 26 is collected by the data management system 10 based on the needs of the specific project. Data management proprietary data 26 can be collected by a designated team or technology using sensors, written notes, data-basing software, photo/video-capture, surveys, and the like.

Figure 4:
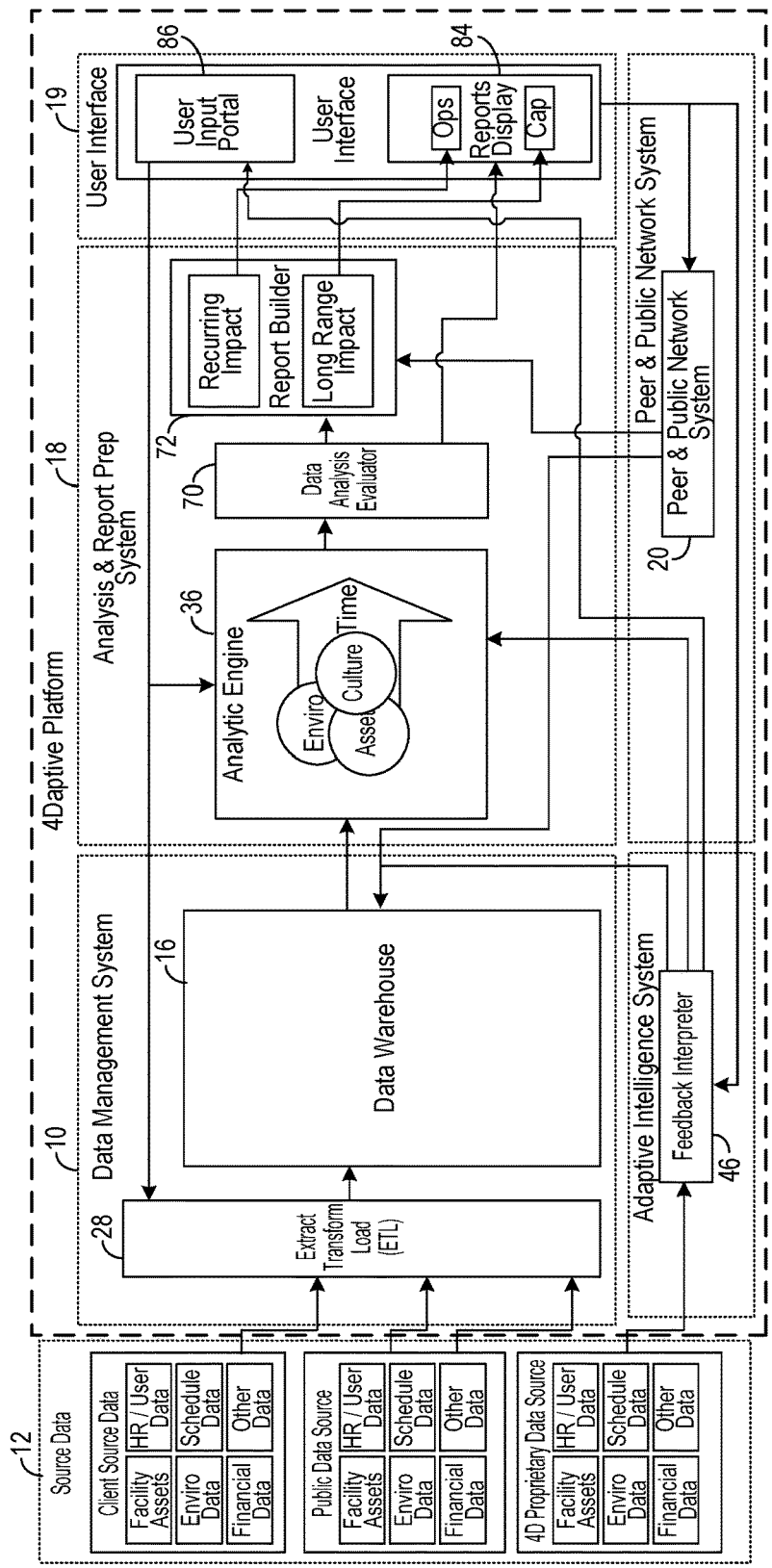
FIG. 4 is an embodiment of the present invention illustrating the types of data being used by the system.
Figure 5:
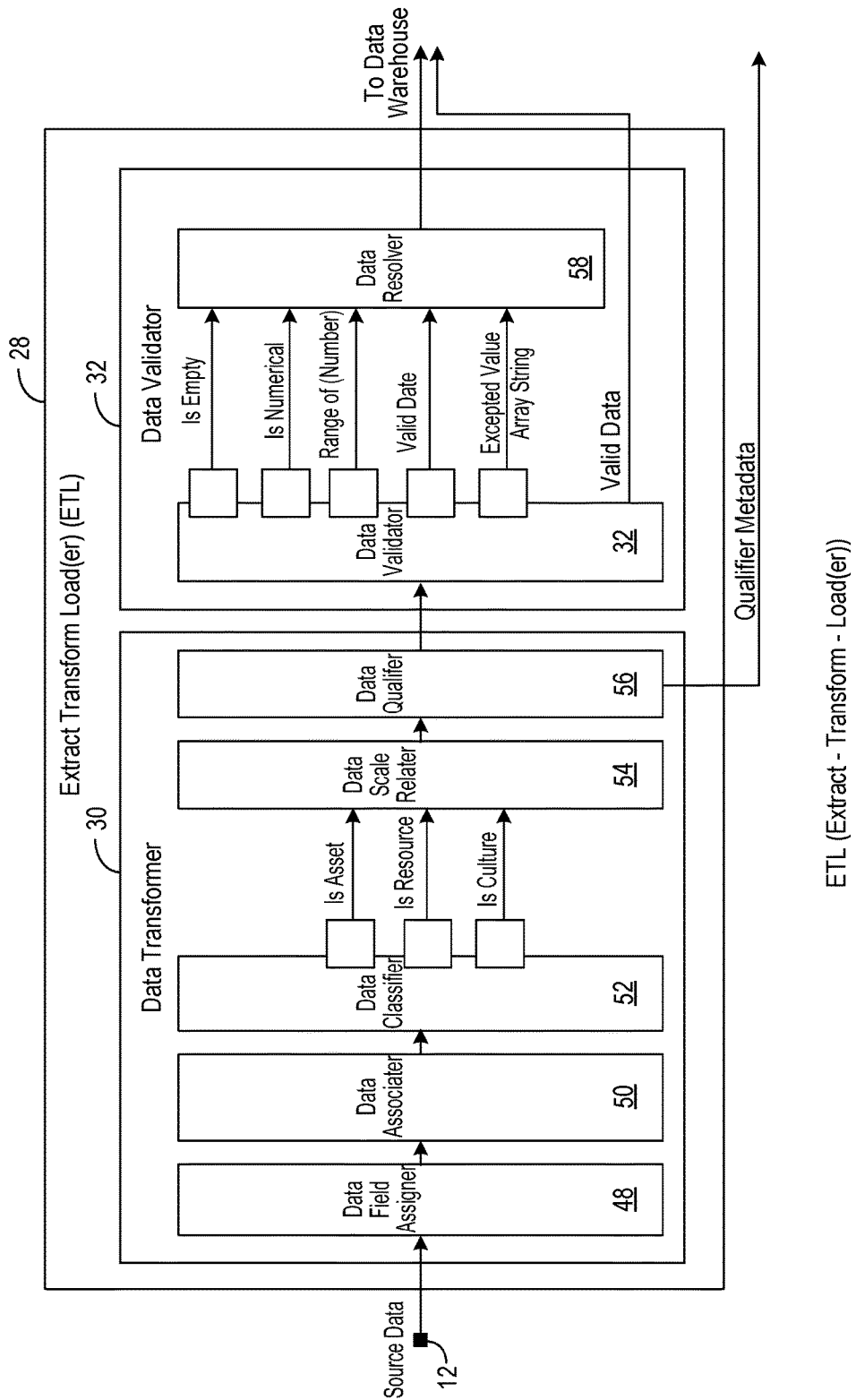
FIG. 5 is an embodiment of the present invention illustrating a component view of the system's extract-transform-loader (ETL).

Referring to FIGS. 4 and 5, data management system 10 transforms the raw source data into a format and logic usable by the platform. The data management system 10 includes an extract-transform-loader (ETL) 28 and the data warehouse 16.

The ETL 28 includes one or more of, a data transformer 30 and a data validator 32. The data transformer 30 includes at least one of; logic for assigning raw source data to predefined data management system database fields; association logic for associating raw data through item/attribute relationships; classification logic for classifying raw data as asset-related, environment-related, culture-related dimensions, time-related, or value-related; logic for relating items to each other based on scale; and qualifying logic for qualifying raw data based on data-related collection methods. The data validator 32 includes validation logic for determining if the raw data is valid for input into the data management system database. This logic includes a set of rules governing valid data format and valid data value for the item or attribute type.

The Data Classifier 52 and Data Qualifier 56 can further include logic for assigning metadata to the raw data during classification and qualification. The metadata is used for analysis, evaluation, and reporting. The data warehouse 16 includes a plurality of databases, selected from at least one of, data management system database, distinct client databases; qualifier metadata; peer network metadata; and data management system historical data.

Source data 12 enters the data management system 10 and is first processed by the ETL 28. The ETL 28 transforms and validates the data before storage. After the data is processed by the ETL 28, it can be sent to the data warehouse's client database and archived in a unique database prior to analysis. The data remains archived until a user creates an executable demand to analyze the data. The data is then passed to the analysis and report preparation 18 where it is analyzed by the analytic engine 36. The analytic engine 36 outputs tables of processed and correlated data that is sent to an analysis qualifier 38 to determine an overall "quality" of analysis based on the accuracy of the data collection methodology, calibration of collection equipment, quantity of data, and so forth. From there the data 12 is sent to a report builder 42 for modeling and scenario building or sent directly to the user interface 19 for reporting.

The data 12 that is sent to a report builder 72 and can be correlated with user-inputted priorities and divided into short-term (recurring) and long-term (future and singular) impact reports and recommendations. These reports are then sent to the user interface 19.

The user interface 19 outputs the reports sent to it by the analytic engine 36 and the report builder 42. Additionally, data and information is sent back into the data management system 10 as it is uploaded and configured by client and administration users.

Peer and public network 20 creates report context by showing client data and information in relation to at least one of large-scale industry trends, peer trends, local benchmarks, and so forth. This data can be collected manually and uploaded through the user interface 19; it may be collected automatically by the ETL; or it can be calculated internally from the historical data database 26.

Adaptive intelligence 21 makes the data management system 10 and analysis and report preparation system smarter by both increasing information context and calibrating their rules and engines. The single component of this function, the feedback Interpreter 46, collects data and information from within the platform, from user interaction patterns and from uploaded data, without limitation to a particular data stream. This information is processed within the feedback interpreter 46, and updates and refinements are made to at least one of data validation logic, association logic, the analytic engine logics, the report builder logic, and the query building and interpretation logic.

Referring now to FIG. 4, all of the source data 12 relates to six types of data: facility assets data, human resources (HR)/user Characteristic data, Environmental data, schedule and other User Operational data, financial and data, and other data types as determined by the specific project as well as potential additional data determined through proprietary methods. The client source data 22, comes from a facility manager, COO, or whoever represents the interests of a client company and has the data available in some format. The public source data 24 comes from public archives such as federal government records, local city planning databases, publicly available indices, public utility records, census records, and so forth. Types of data collected include historic retrofit costs, real estate valuation, salary costs, absentee rates, education level, historic energy use, rates, types, and the like. The data management system proprietary data 26 comes from data collected by the data management system 10 using custom installed sensors, researcher perceived observation, privately secured and maintained rates and indices, privately secured client information, and other data management system 10 data collection methods and the like.

FIG. 5 illustrates the ETL 28 that prepares incoming raw data for storage and analysis within the data management system 10. The ETL data transformer 30 receives source data 12 from user-uploaded data in the form of comma separated values, or other standard format understood by the data management system 10. These values may be mapped by the user to the appropriate data management system data categories (Parent, Alias and the like.). Once the source data 12 is mapped to the data management system 10 by the data field assigner 48 the data is sent as a "batch" to a data associator 50. In the data associator 50, a batch of data is accepted comprising individual data "objects". The data associator 50 uses an association logic to sort objects into Items and attributes, and relate them to each other. Items are real world "things" and attributes are descriptors of the items, or "adjectives" related to the items. For example, a classroom is an item and "transparency coefficient of the room walls" is an attribute related to the room.

The associated data is then sent to a data dimension classifier 52 for classification into one of the five dimensions: asset, culture, environment, value, and/or time. Asset-related data may refer to items such as rooms, mechanical and lighting systems, windows, buildings, and the like. Environment-related data may refer to units of energy, amount of solar energy collected, available water resources, weight of a client's waste, consumable organizational resources, statistics associated with contextual environmental variables (interior surface temperature, exterior air temperature, humidity, rainfall, acoustics, $CO_2$ Levels, etc.) and the like. Culture-related data may refer to characteristics associated with individual people, departments, and organizations such as health, ethnicity, education level, morale, technology adoption rates, productivity and the like. Value data may refer to balance sheet information, income statement information, unit costs, financial indices, as well as non-financial value data such as sustainability, renewability, brand awareness, happiness, and crime rate. Time-related data may refer to durations of study, frequency of data collection, milestone for projections, impact on schedule, historic and projected trends patterns, and the like. The data dimension classifier 52 tags all pass through data with metadata classifying it as one of the above dimensions.

The classified data is then sent to the data scale relater 54 to be tagged with metadata relating all of the dimensional items to each other by scale. Scale may be defined as a level of study ranging from a close-up, more detailed view to a less detailed, high-level view. Scale may relate across dimensions using non-dimensional metadata similar to scale using an architectural ruler, or it may be unrelated across dimensions depending on the specifics of the analysis.

The scaled data is then sent to a data qualifier 56 where it is again tagged with metadata related to data collection methods and accuracy. These metadata may include but not be limited to whether or not the data was collected by a client or specialized team, whether or not the data was double-checked, how recent the data was collected, the accuracy of the sensors if applicable, and so forth. Once the data is qualified it sent to the data validator 32.

The data validator 32 runs an algorithm matching at least one of the actual data formats, types and values to the expected value types, value thresholds, and so forth for the mapped categories. In other words, if a data table is mapped to the data management system "data" protocol, then the data validator 32 expects all of the data values to be formatted as dates. If a batch does not conform to the expected data types, then the batch is flagged for review and sent to a data resolver 58. Additionally, if a data value is outside of the expected range for a particular data type, then it will be flagged for review as well.

Data sent to the data resolver 58 may be accepted or rejected. Data that is transformed and validated successfully is then sent to the data warehouse 16 for storage in one of several possible databases.

Figure 5A:
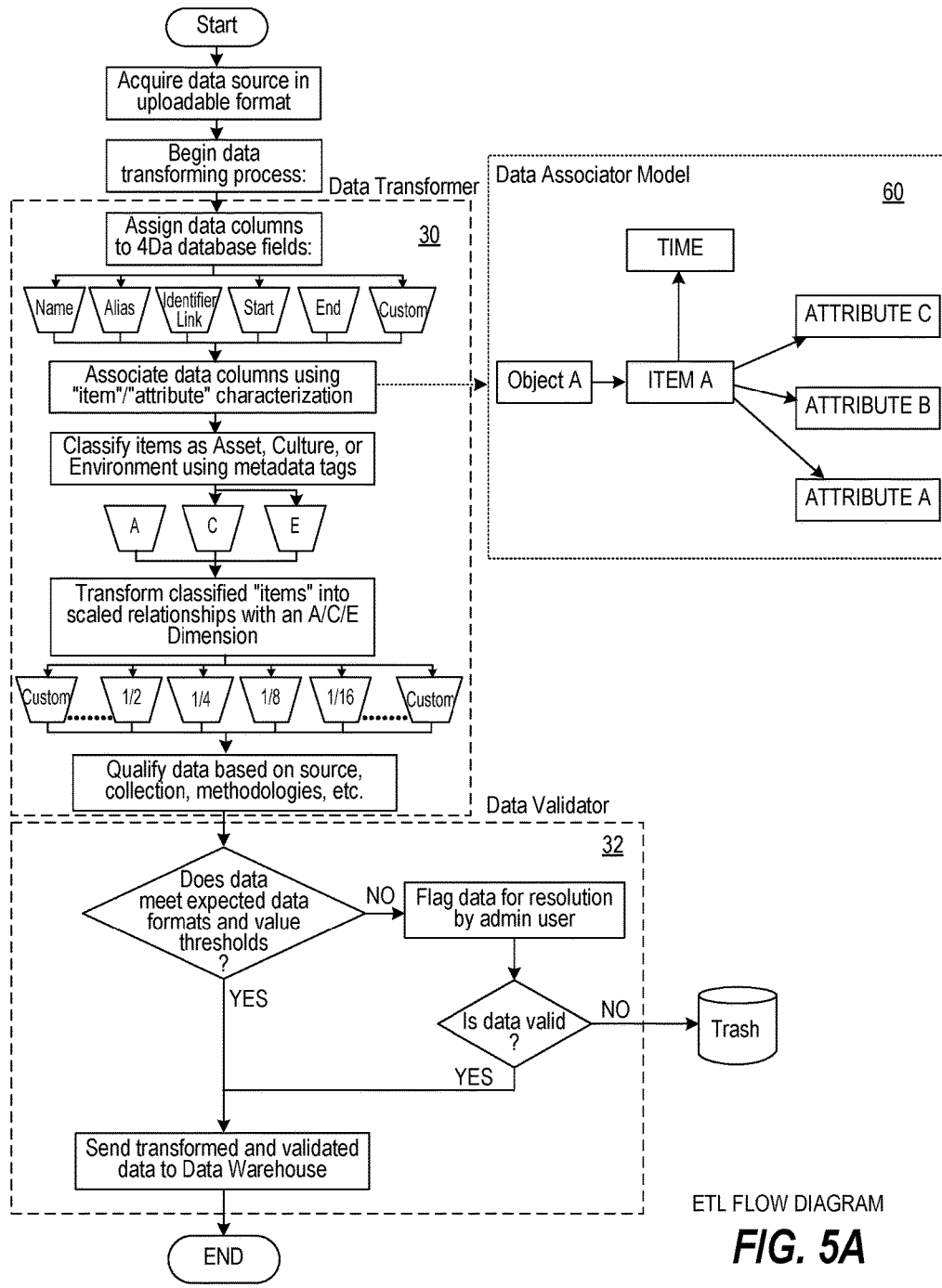

Referring to FIG. 5(a), operation of the ETL 28 is illustrated. Source data is acquired and uploaded and the data transforming process begins. The data transformer 30 assigns data columns to data management system database fields. Data columns are associated using item/attribute characterization. The data associator model 60 is coupled to the data transformer 30 and receives the associated data columns. The data associator model 60 takes object A and produces item A with associated attribute C, attribute B and attribute A related to the item by time. Items are classified as asset (A), culture (C) or environment (E) using metadata tags. Classified items are transformed into scaled relationships with an A/C/E dimension. Data is qualified based on source, collection methodologies and the like. The data validator determines if the data meets expected data format and value thresholds. If yes, the transformed and validated data is sent to the data warehouse. If not, the data is flagged for resolution by an admin user. If the data is valid, or made valid, it is sent to the data warehouse 16. If not, it goes to trash.

Figure 6:
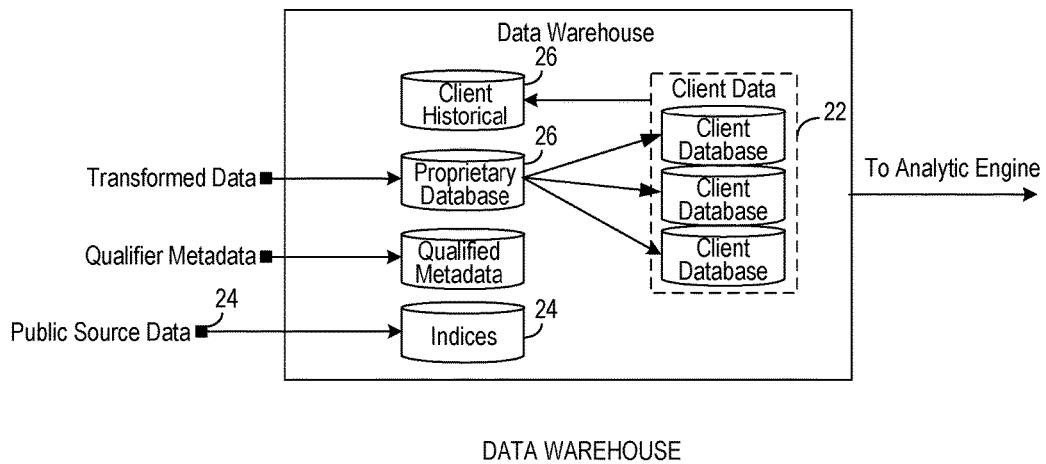
FIG. 6 is an embodiment of the present invention illustrating an internal view of the system's data management system database.

FIG. 6 illustrates that the data warehouse 16 represents the location where data is archived after being processed by the ETL 28.

Figure 7:
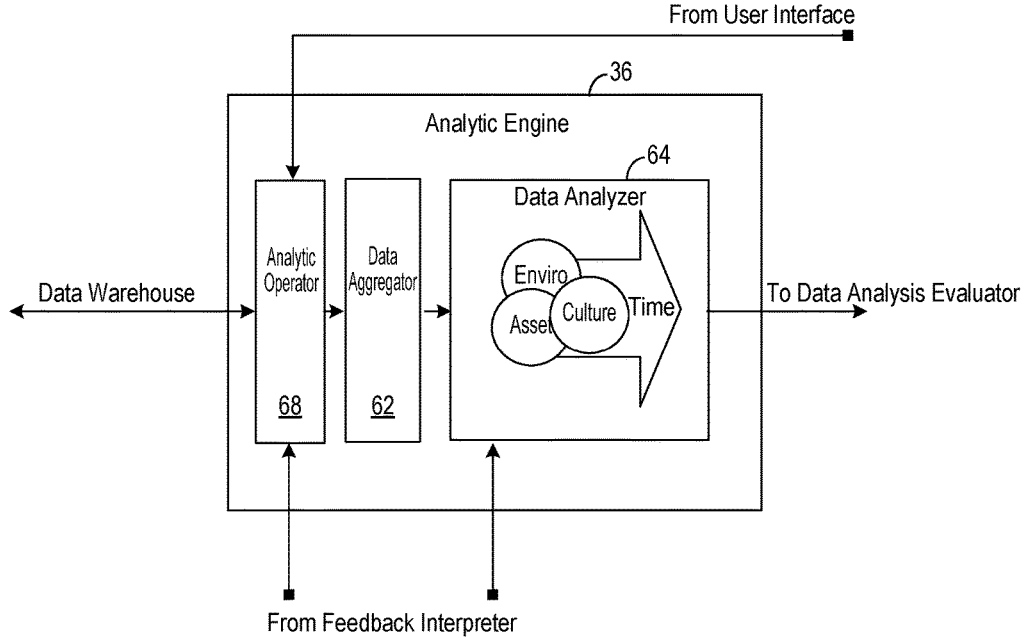
FIG. 7 is an embodiment of the present invention illustrating a component view of the system's analytic engine.

Referring to FIG. 7, analytic engine 36 runs correlations, calculations, comparisons, and other data management system analysis per user query settings. As a non-limiting example of a building, the calculations can be: occupancy calculation, utilization calculation, monthly energy use per square foot calculation, and the like. As a non-limiting example, comparisons can include: energy use compared to occupancy over one month, building maintenance frequency versus monthly sky conditions and the like. As a non-limiting example, the correlations can be: high occupancy correlated with high energy use, high student performance correlated with the quantity of natural daylight in a classroom, employee productivity per building between specified dates, absenteeism rate of a specific function type per floor during a specified weather condition, and the like.

FIG. 7(a) is a flow chart that illustrates operation of the analytic engine 36. The analytic engine 36 is associated with the analytic operation, data aggregator 62, data analyzer 64 and the data aggregator model 66. An analytic operator 68 receives an analysis query from the user interface 19 and interprets the query to determine data needed to produce a query answer. Required data is called from the data warehouse 16. If the attributes need to be scaled to a less detail view then the data aggregator 62 runs a data aggregator model 66 to aggregate attributes of a more detailed item into attributes of a less detailed item. The data aggregator model 66 then receives the various items and associates attributes to the item to create a new item with a new attribute. When the query requires a mathematical operation before being sent to the user interface 19 and the data analyzer 64 runs the mathematical operation and stores the resultant data in a new table. If the query does not require a mathematical operation then a determination is made to determine if the query is part of a report request. If not, then a data table is sent to the user interface 19. If the query is part of a report request then a data table is sent to the advisor for inclusion in the specified report.

The analysis and report preparation system 18 runs multi-dimensional analysis on data in the data warehouse 16, and prepares reports relating the analysis to short-term (recurring) and long-term (future and singular) value information related to client priorities. In one embodiment, the analysis and report preparation system 18 includes the analytic engine 36, data analysis evaluator 70 (FIG. 8), and report builder 72 (FIG. 9). In one embodiment, the analytic engine 36 includes, the analytic operator 68 that interprets user queries; the data aggregator 62 that aggregates items and attributes at different scales; the data analyzer 64 that executes multi-dimensional calculations, comparisons, correlations, and other operations on selected data sets.

In one embodiment, the analytic operator 68 includes: query logic to interpret user queries related to a specific client assignment; and retrieval logic to determine which data sets are required from the data warehouse 16 to execute the requested analysis.

The data aggregator 62 has item/attribute aggregation logic to aggregate attributes from a more detailed scale into an attribute(s) for an item in a less detailed scale. For example, a room may have multiple temperature sensors in multiple zone locations within the room. A user may want to see the room as an item with a single temperature attribute and see the building with a single temperature attribute. To do so, all or a selection of the temperature measurements may be aggregated into a single item and attribute association at the room level. In this case, the temperatures are collected by unique sensors, each classified as an item in the data management system platform. To attribute a single temperature value to a single item, an average of the selected temperatures can be taken and associated with an existing room item, or a new item representing the room may be created. Then the attributes may be combined again for all of the rooms in a building to form a single temperature attribute for the entire building. This example shows at least two scale jumps, one from the zone level to the room level, and another from the room level to the building level.

The data analyzer 64 runs logic selected from at least one of: logic to compare data sets within a single dimension or across dimensions, over time, and related to value (comparison logic); logic to calculate averages, minimums, maximums, ranges, and other mathematical functions on a data set within a single dimension or across dimensions (math logic); and logic to correlate attributes to outcomes expressed as value, data set calculations, or other within a single dimension or across dimensions (correlation logic). Operation of one of these logics may involve an input that is the result of logic. For example, comparing occupancy to energy use using comparison logic may first require calculating occupancy (math logic) and using it as an input in the comparison.

In one embodiment, the previous logics (comparison, math, and correlation logic) may be applied in conjunction with dimensional analysis logic which includes a single dimension or multiple dimensions of data leading to different orders of data management system analysis. These orders consisting of: first order data management system analysis with data from a single dimension of asset, environment, or culture; second order data management system analysis with data from at least two dimensions of asset, environment, and/or culture; and third order data management system analysis with data from all three dimensions of asset, environment, and/or culture.

FIG. 7(b) is a flowchart illustrating data management system analysis with increasing dimensionality and increasing or decreasing scale. First, second and third order analysis is performed at different scales as referenced on the vertical axis of the flow chart.

Figure 7C:
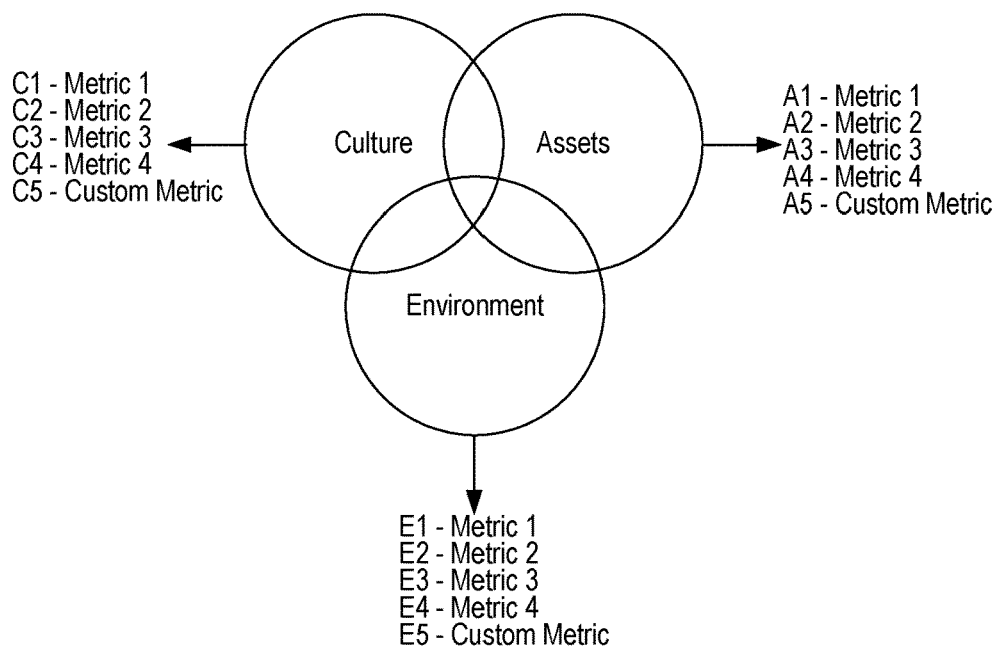
Figure 7D:
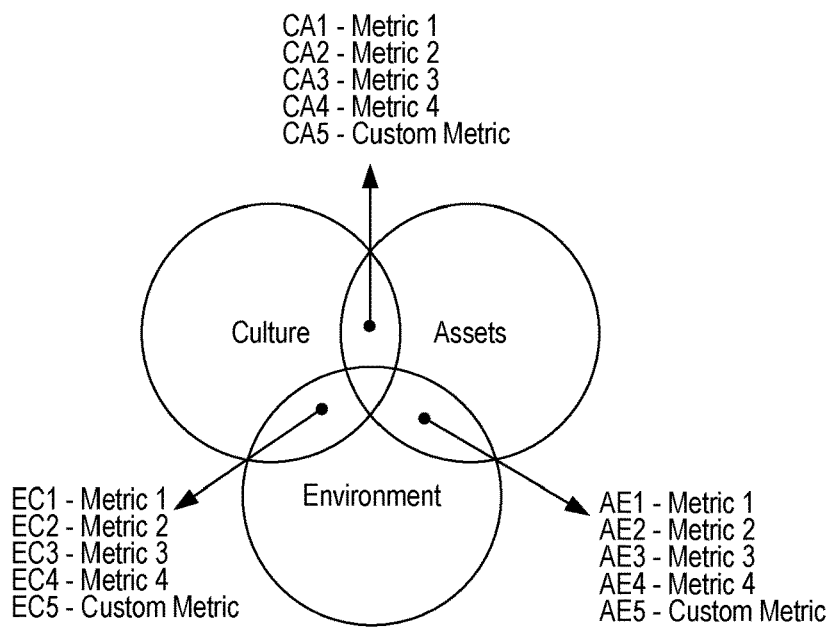
Figure 7E:
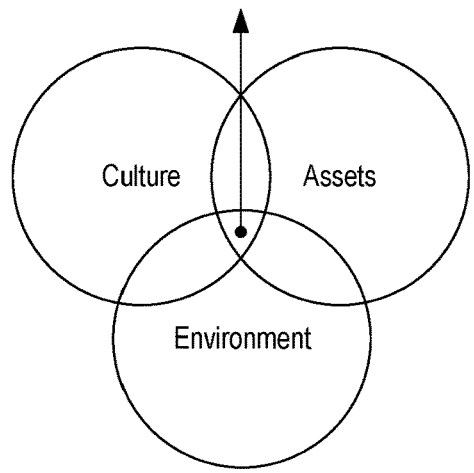
Figure 7F:
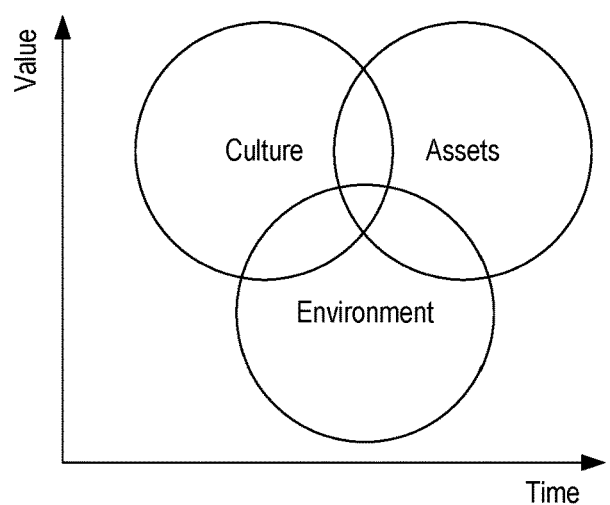

FIGS. 7(c)-7(f) are Venn diagrams illustrating the dimensional logic of the analytic engine 36. FIG. 7(c) shows the 1.sup.st order of analysis represented by data coming from within individual dimensions and among individual dimensions without cross-operations. FIG. 7(d) shows the 2.sup.nd order of analysis with data coming from the areas of intersection between two dimensions. As a non-limiting example, occupancy would be considered a 2.sup.nd order calculation because it requires culture-related data (number of people) and asset-related data (capacity of room based on square footage, or other criteria). FIG. 7(e) shows the 3.sup.rd order of analysis where data is taken from the intersection of all three dimensions. As a non-limiting example, a chart showing the energy use (E) by occupancy (C) associated with a specific sector a building (A) would be considered a 3.sup.rd order analysis because it uses data from all three dimensions. Finally, FIG. 7(f) shows the three-dimensional Venn diagram with respect to time and value. This indicates that time and value can be related to the three physical dimensions to understand how the metrics change over historic or projected time and how that affects financial and non-financial value.

The data analysis evaluator has evaluator logic for calculating a quality score for the information generated by the analytic engine, with the score being based on qualifier metadata referenced in the ETL's data qualifier 56. The evaluation logic uses the qualifier metadata, possibly with a weighting system, to determine an analysis ranking that may be indexed across all reports, against other indices, or against an ideal standard. The ranking allows users of the data to quickly understand the quality and relative value of the data analysis.

The report builder 72 communicates with the analytic engine 36 and the data analysis evaluator 64 to generate reports related to specific client assignments.

Reports generated by the report builder 72 are packaged for presentation to the user in terms of capital (Long-term and singular) and operational (Short-term and recurring) allocations determined by client priorities.

Figure 8:
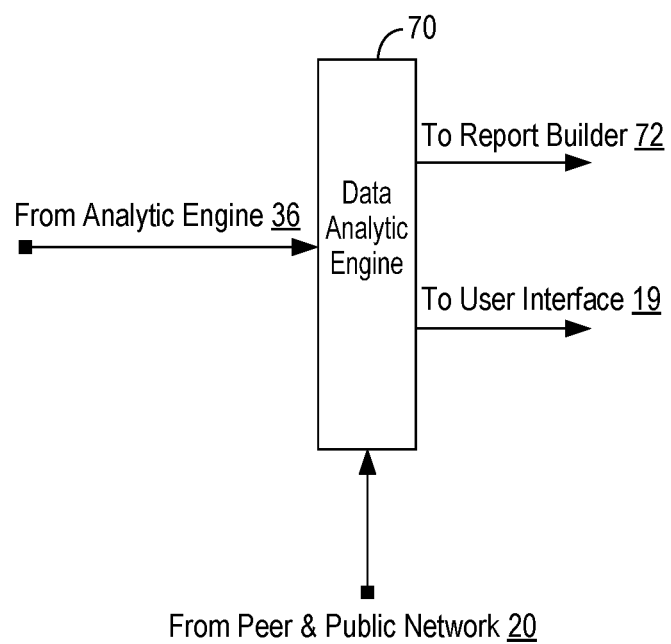
FIG. 8 is an embodiment of the present invention illustrating a component view of the data analysis evaluator.
Figure 9:
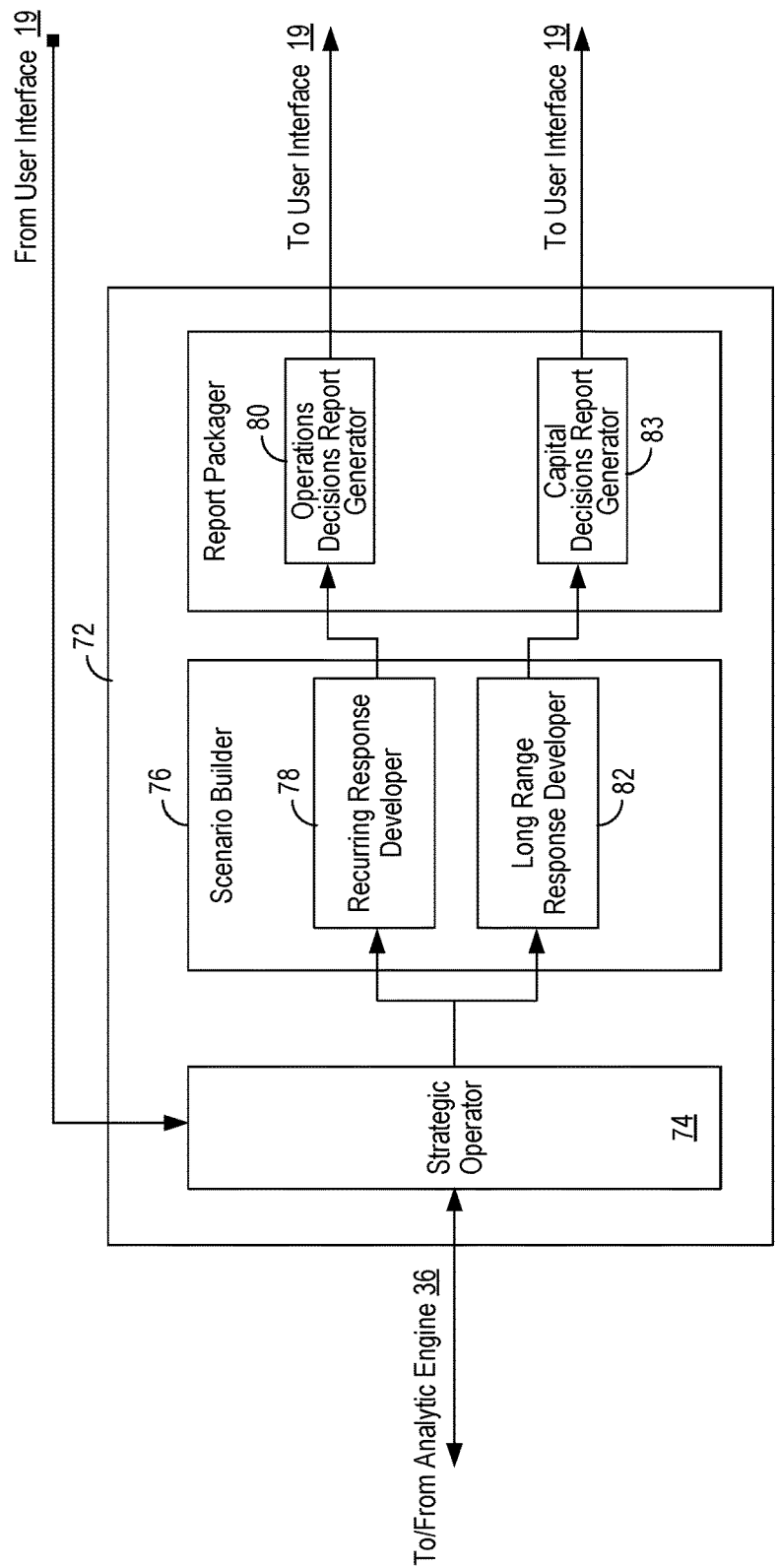
FIG. 9 is an embodiment of the present invention illustrating a component view of the report builder.

A diagram of the data analysis evaluator 64 is illustrated in FIG. 8 which assigns a relative rating or handicap based on the data's qualifier data, to the information created by the analytic engine.

As illustrated in FIG. 9 the report builder 72 receives formalized data from the analytic engine 36 and user-prioritized lenses (obtained from a master set list of lenses) from the user interface 19. A strategic operator 74 receives the data from both components and feeds the data into a scenario builder 76. The scenario builder 76 uses defined relationships between the user-prioritized lenses and the incoming data to determine possible short-term and long-term responses, scenarios, to client facilities and operations. The short-term responses are developed by the recurring response developer 78 and are passed to the operation decisions report generator 80 for "packaging", in that the data and models are ordered, contextualized, and made ready for visualization by the user interface 19. These responses affect the everyday operations of the facility, and therefore relate to non-fixed assets. The long-range response developer 82 produces models that predict outcomes based on capital responses including but not limited to changes such as sale or renovation of fixed assets, relocation of personnel, and infusion of new funds. Operation decisions report generator 83 and long-range response developer 82 send their reports to the user interface's 19 sub-component graphic display 84 for presentation to the user.

Figure 10:
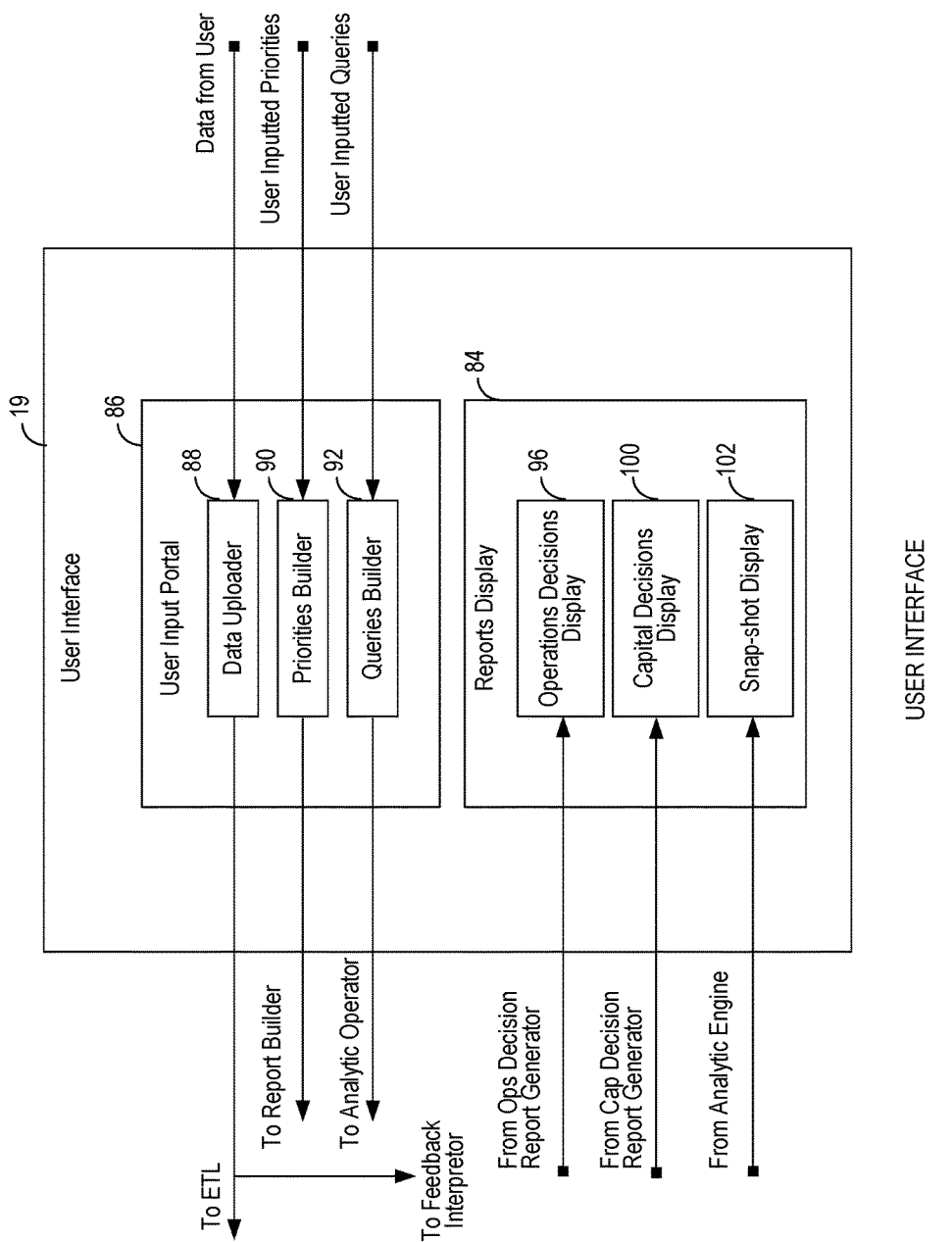
FIG. 10 is an embodiment of the present invention illustrating a component view of the user interface.

FIG. 10 illustrates an internal view of the user interface 19. The user interface 19 receives input from the data management system 10 user through a sub-component user input portal 86. The user interface 19 allows users to perform a variety of different activities including at least one of: setting organizational priorities; inputting data; building queries to define specific assignments and viewing reports.

The user input portal 86 can include up of three subcomponents that the user interacts with: a data uploader 88, priorities builder 90 queries builder 92. Additionally, the user input portal 86 provides a range of services that support the use of these components, not-limited to default options (i.e. pre-set selections for both queries and priorities), query recommendations, and other user-centric features.

The data uploader 88 provides data uploading services to platform users. These services provide both automatic upload options, such as for a non-limiting example, downloadable API's that communicate with user computer systems and manual upload options (e.g. templates for data input). The user enters the user Input portal 86, selects the data uploader 88, and chooses how to upload the data. The data uploader 88 can receive a pre-set list of file types including but not limited to .xls, .csv, .xlm, .kml, .rvt, .jpg, .doc, and the like, determined by the capabilities of a translator 94 and the application program interfaces (API's) available for communication through the data uploader 88.

Data from the data uploader 88 is sent to the translator 94 if the data is from a project that is new to the platform. If the data is coming from a project that has already been analyzed by the platform, then the data is sent to the platform refiner 610 for model calibration.

The priorities builder 90 allows the platform user to choose the type and relative importance of the 'values' to optimize their institution related to a variety of objectives, including but not limited to, sustainability, financial annual bottom-line, employee health and wellness, long-term productivity improvements, brand awareness and the like. These 'values' can be thought of as lenses that an advisor 96 wears when making short-term and long-term reports. The platform user prioritizes these lenses relative to each other using a numeric scoring reference with variable scores which can be adjusted by the user but will sum to preset total. As a non-limiting example, if there are ten lenses with a preset total of 100 points, then each will have a numeric score attached to it ranging from 1-91 with the other nine lenses having an allocation set by the user for the remainder of the points for a total of 100 points.

Each lens may be made up of sub-lenses that deconstruct the primary lenses into simpler value judgments for the user. As a non-limiting example, a lens of sustainability may be constructed of the sub-lenses water use, energy use, building materials, site location, and the like where the user rates the importance of these sub-lenses as a sub-total of the value of the master lens: in this case, sustainability.

The scenario builder 76 uses the prioritizations from the priorities builder 90 to determine which primary lenses will most influence the model development. Once a primary lens is selected, the sub-lenses, which relate to measurable building operations or capital decisions, are used to evaluate long-term and short-term responses. For instance, if sustainability is selected as a top priority, and water usage is selected as a top-priority sub-lens, then the scenario-builder 76 can solve for optimized water usage above other primary and sub-lenses in both its short-term and long-term responses.

Weightings and correlations of the lenses are numerous and can be reoriented in several different ways. The design allows for flexibility in how these lenses are prioritized, how they relate to the data being fed into the Analysis and Report preparation system 18 of the data management system 10, and how they are presented in the final reports.

The queries builder 92, also illustrated in FIG. 14, further develops the user input portal 520 by adding a command search functionality to the interface. By default, the queries builder 92 may already be set-up to request a particular type of output, in a particular sequence, related to a particular time horizon, and so forth. This default request may be project-specific, that is based on the type of data entered into the platform tagged to a specific project, related to global conditions, including but not limited to, types of output most educational organizations, government agencies, and healthcare institutions are interested in and the like, related to a "linked-network", that is based on the type of output that most of these 'peer' institutions are interested in.

In the above case, "linked-network" refers to an opt-in network of peer institutions determined by several criteria and available in a multitude of varieties. For instance, top ten US Graduate Schools of Business may want to opt-in to a "linked-network" of these ten peer institutions that give a varying degree of context to the data output received from the platforms reporting function. For instance, members of the "linked-network" may use averages from the network as benchmarks for performance. Additionally, the "linked-network" may have query defaults based on user patterns, or other smart platform features based on network trends. Thus, a query default may be based on the user patterns of these institutions or related to some other platform determined criteria. Users may decide to search for a specific type of dimensional information, or construct a different order of reports, or in some way alter the report outputs. To do so the user can change the settings in the queries builder 92. Changing the settings can be made by, but not limited to, altering the fields for search, typing in a text-string question, or selecting from a pre-set list of report outputs.

Queries generated by the queries builder 92 are sent to the analytic engine 36 or the advisor 96 depending on the type of query. Queries that require "sense-making" (i.e. an explanation), or user-defined prioritization, are sent to the advisor 96 and eventually outputted in the form of short-term impact and long-term impact reports. Whereas queries that require only a "noisy", uncorrelated data output may be sent directly to the analytic engine 36, and from the analytic engine's 36 output to the graphics display 84, bypassing the advisor 96.

Figure 11:
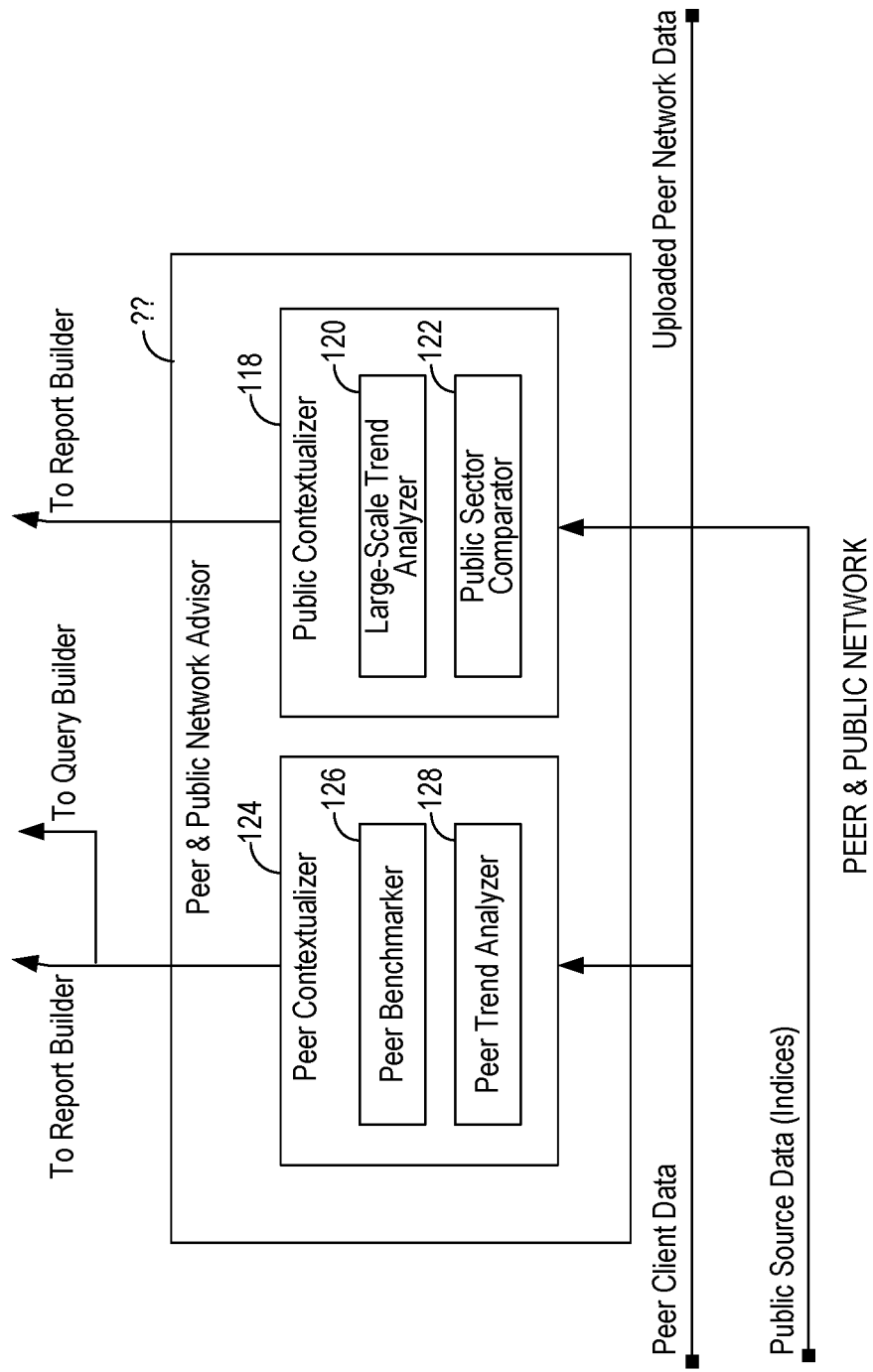
FIG. 11 is an embodiment of the present invention illustrating a component view of the peer & public network.

As illustrated in FIG. 11, the reports display 84 is configured to visualize data tables sent to it by the analytic engine 36 and the advisor 40. The visualization tool may be a proprietary, in-house tool or an off-the-self product, including but not limited to, Data Graph, Wonder Graph and the like, and customized to receive these data tables and graphically visualize their relationships as directed by the analytic engine 36 and advisor 40, which are preset to output relationships in default ways. These visualizations may include, but are not limited to: histograms, bar charts, heat maps, bubble maps, pie charts, and architecture drawing overlays, time-lapsed animation and the like. All charts can have default settings but may be customized by the platform user based on project specifications, including but not limited to, levels of access which limited functionality for some users and the like.

In one embodiment, the graphics display 84 includes three sub-components: the operations decisions display 98, the capital decisions display 100, and the snap-shot display 102. The operations decisions display 98 receives reports from the operations decisions report generator 80 and visually presents those reports to the platform using a plurality of techniques: static display, interactive display, downloadable documents and the like. The visuals may be singular or exist in relation to several visual and text that make up the report. The capital decisions display 100 receives reports from the long-range response developer 82 and presents similar visuals as stated above except that they relate directly to long-term, fixed asset decisions. These reports, both operations and capital can be designed for a range of general executive functions in an organization such as the CEO, COO, CFO and the like, as well as for specialized job functions such as Facilities Director, Operations Director, Human Resources Director, and the like, for their interpretation and implementation.

The snap-shot display 102 visually displays output from the analytic engine 36. Data tables coming from the analytic engine 36 may not be correlated with user-defined priorities or be contextualized. In general, these reports are a "snap-shot" of current conditions as analyzed by the analytic engine 36. As a non-limiting example, they may display a specific sub-set of room occupancy at a point in time for a specific building, or over a set period of time and the like.

Figure 12:
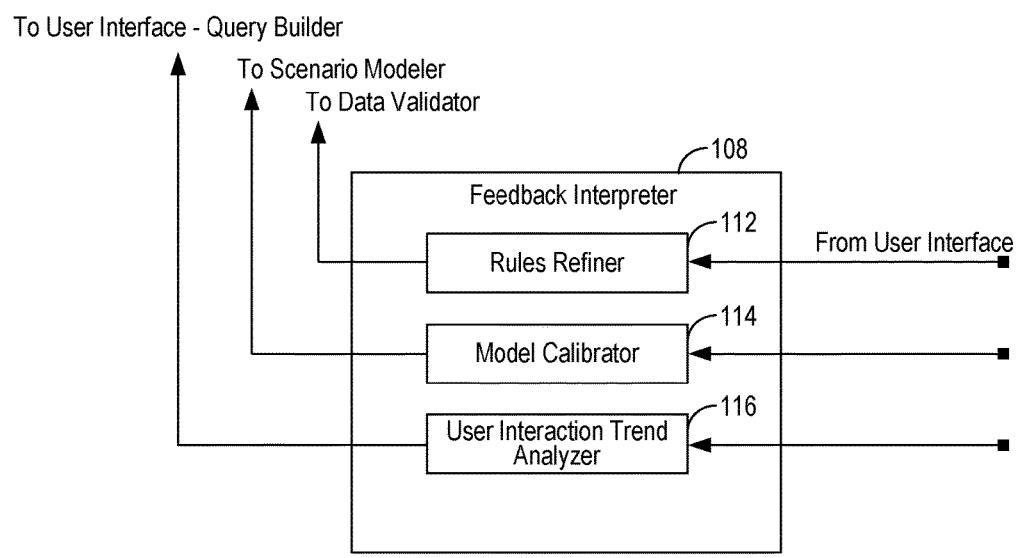
FIG. 12 is an embodiment of the present invention illustrating a component view of the adaptive intelligence system.

FIG. 12 illustrates an internal view of the feedback Interpreter 104, a component within the system's adaptive intelligence. The feedback Interpreter 104 collects data from within the system, including but not limited to user interface patterns, non-first-time project data and the like, as well as outside of the system, including but not limited to large-scale economic trends and externally published indices, and the like, as well as from within "linked-networks" such as peer trends and the like. This data is then interpreter by several sub-components within the feedback Interpreter 104 and used to increase the intelligence of the system's advising, recommending, and analyzing—also known within the system as 'adaptive intelligence'.

The feedback interpreter 108 handles the internal data collection pulling data from the user-interface 19. The noise-canceling refiner 110 analyzes all source data coming into the system, categorizes it, and creates "like" relationships between data sets (i.e. two academic institutions with similar characteristics will be related to each other). These "like" relationships will be used to refine the validation logic used by the data validator 32. Using this methodology, the data validator's logic will become more accurate in identifying erroneous and invalid data.

The model calibrator 114 pulls data from the data uploader 88 if the data is tagged as a previously uploaded data set, including but not limited to the same data such as a non-limiting example facilities asset data, from the same project was uploaded to the data management system database 34 at an earlier time. As a non-limiting example, this can be termed 'data set 2'. This data is then compared to the previously stored data set 'data set 1'. Patterns and anomalies are analyzed and differences in the two time-stepped data sets are analyzed. If enough contextual data is available, other data sets uploaded for the second time, the model calibrator 114 will automatically use multi-variant statistics to determine causalities among data sets and use its findings to refine model prediction in the scenario-builder 76. If there is not enough contextual data to automatically determine causalities, then the differences in singular data sets will be compared and conclusions regarding causality will be determined by service technicians working on the projects. As a non-limiting example, conclusions regarding a data set about water usage differences from January compared to the same water usage data set from March without any other relevant data provided during analysis can be made manually by a technician who can investigate various causes.

A user Interaction trend analyzer 116 pulls data from the user interface 19 while the user is interacting with the interface. This data may come from user query patterns, user priority building patterns and the like.

A public contextualizer 118 pulls data from public source data 24 and analyzes it in relation to platform projects. This data then provides 'context' to platform data, helping platform users understand how their data measures up or relates to large-scale public trends and other facilities with information in the public sphere. Within the public contextualizer 118, the large-scale trend analyzer 120 pulls macro-data that is trending, including but not limited to financial market building indices, building cost indices, human resource trends, occupancy trends, labor trends and the like. As a non-limiting example, this component may grab US News and World Report 2012's Top 10 Business school index and search it for characteristics relevant to the platform's analysis. The public comparator 122 pulls relevant data that is publicly available and "like" a platform user's project ("like" refers to a variety of similar characteristics between projects that make comparison relevant). This data is used to place the platform user's project performance in context with other project performances.

A peer contextualizer 124 acts in a similar way to the public contextualizer 118 by providing data that contextualizes performance by platform users' Assets, Environment, and Culture. However, the peer contextualizer 124 collects data solely from "linked-network" members. This data can contain more relevant and more specific information than the public contextualizer 118 because it is shared within a closed-network of peer institutions that have opted to share with each other. A peer benchmarker 126 provides sample data from "linked-network" members to the advisor 40 to contextualize the reports delivered to other "linked-network" members from the same network. A peer query analyzer 128 provides query suggestions to the user-interface 19 to help guide the querying by other "linked-network" members, including but not limited to the queries builder 92 that adjust query defaults to match querying patterns by "linked-network" members.

The adaptive intelligence performs at least one of: recognizing patterns in user interaction; measuring predicted verses actual outcomes; calibrating data management system 10 proprietary data; and adjusting the rules used by the data validator in the data management system 10. Calibration refers to refining the accuracy of the proprietary data.

The peer network advisor provides a comparison of a first client specific report to one or more different second client specific reports.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A method for analyzing business intelligence applied to at least one of physical assets and environment factors, comprising:
    a plurality of physical assets;
    a data management system that includes an extract transform load (ETL) that includes a physical asset data analysis validator which determines if data from at least a portion of the plurality of physical assets meets value thresholds, if yes the data is sent to a data warehouse of the data management system, an adaptive platform that includes one or more analytic engines for at least a portion of the plurality of physical assets, and a report builder coupled to the plurality of physical assets, a data warehouse, an adaptive platform that includes one or more analytic engines, a data analysis evaluator, the data warehouse coupled to the server farm, the warehouse including a plurality of databases selected from at least one of: a data management system database;
    one or more processors of the data management system correlating data from the multi-dimensional analysis and organizing a plurality of streams of data into their items and their attributes;
    using a computing system that includes one or more processors of a data management system for at least one stream of data selected from at least one of physical assets and environment factors;
    using one or more analytic engines to receive the items with their attributes from the data management system and provide multi-dimensional analysis relative to a scale of study for at least one physical asset and environmental factor;
    using a data analysis evaluator to determine a quality score for information generated by the analytic engine, the data analysis evaluator having evaluator logic for calculating a quality score for the information generated by the analytic engine, with the score being based on qualifier metadata referenced in a data qualifier of the ETL;
    using one or more sensor inputs from sensors to provide sensor input selected from at least one of: an account attribute category, an anomalous load sensor input category, a calculated status input category, a current analysis sensor input category, a missing data sensor input category, a disconnected sensor input category, a measurement device event sensor input category, a monthly measurement device anomalous load sensor input category, a monthly measurement device consumption on inactive sensor input category, an outage sensor input category, a stolen measurement device sensor input category, an unusual production sensor input category, a work order sensor input category, or a zero reads sensor input category, the sensor input providing a feedback loop to the data management system for business intelligence;
    a user interface that a user uses to interact with the data management system, the user interface providing at least one of: a graphic display, query navigation, and a report output; and
    short-term responses are developed by a recurring response developer and a long-range response developer predicts outcomes based on changes to at least a portion of the physical assets, the long-range response developer produces models that create physical renovations of fixed physical assets, the long-range response developer sending a report of the renovations to the user interface for presentation to the user.

2. The method of claim 1, wherein the environmental resources are directed to energy management.

3. The method of claim 1, wherein the environmental resources are directed to at least one of energy use or energy consumption.

4. The method of claim 1, further comprising:
    determining a plurality of inputs from a plurality of sensors; and
    applying business intelligence analysis to the inputs to identify energy usage conditions associated with non-technical loss.

5. The method of claim 1, further comprising:
    applying business intelligence analysis to generate a plurality of representations for the plurality of energy usage conditions, the plurality of representations generated based on the inputs for the plurality of sensors; and
    producing an output that identifies non-technical loss.

6. The method of claim 5, wherein the business intelligence analysis classifies at least a third portion of the plurality of sensor outputs within an allowable dimensional proximity from a first portion of sensor outputs as corresponding to non-technical loss and that classifies at least a fourth portion of sensor outputs within an allowable dimensional proximity from the second portion of sensor outputs as corresponding to normal energy usage.

7. The method of claim 2, further comprising:
    receiving new sensor inputs from the plurality of sensors that are associated with an energy usage condition;
    generating a new representation for a particular energy usage condition based on the new sensor outputs; and
    using a data classifier to classify the new representation.

8. The method of claim 5, further comprising:
    applying business intelligence analysis to the new representation to modify the data from a data classifier.

9. The method of claim 7, further comprising:
    identifying the new sensor outputs as corresponding to non-technical loss;
    reporting the non-technical loss to an energy provider associated with the particular energy usage condition.

10. The method of claim 7, further comprising:
acquiring, from the energy provider, at least one of a confirmation or a non-confirmation regarding an energy usage condition.

11. The method of claim 7, further comprising:
modifying data from the data classifier based on the at least one of the confirmation or the non-confirmation.

12. The method of claim 2, wherein business intelligence analysis is associated with at least one of a support vector machine, a boosted decision tree, a classification tree, a regression tree, a bagging tree, a random forest, a neural network, or a rotational forest.

13. The method of claim 2, further comprising:
identifying a plurality of measurement devices that have likelihoods of being associated with the non-technical loss; and
ranking the plurality of measurement devices based on the likelihoods of being associated with the non-technical loss.

14. The method of claim 10, further comprising:
determining that at least some of the plurality of measurement devices meet specified ranking threshold criteria; and
identifying the at least some of the plurality of measurement devices as candidates for investigation.

15. The method of claim 2, wherein one or more sensor inputs from the sensors provide sensor input selected from at least one of: an account attribute category, an anomalous load sensor input category, a calculated status input category, a current analysis sensor input category, a missing data sensor input category, a disconnected sensor input category, a measurement device event sensor input category, a monthly measurement device anomalous load sensor input category, a monthly measurement device consumption on inactive sensor input category, an outage sensor input category, a stolen measurement device sensor input category, an unusual production sensor input category, a work order sensor input category, or a zero reads sensor input category.

16. The method of claim 2, further comprising:
acquiring a set of formulas for the set of sensor outputs, each formula in the set of formulas corresponding to a respective input from the plurality of sensors; and
calculating input for at least a plurality of inputs based on the set of formulas.

17. The method of claim 2, wherein at least a portion of the inputs are in response to data acquired from a plurality of measurement devices associated with the plurality of energy usage conditions.

18. The method of claim 2, wherein a first input is generated in response to modification of a second input from the plurality of sensors.

19. The method of claim 1, further comprising:
receiving from an energy provider at least one input not included in the plurality of inputs relating to energy usage conditions to identify non-technical loss.

20. The method of claim 2, wherein the business intelligence includes an unsupervised process, and wherein the unsupervised process utilizes unclassified data for identifying non-technical loss.

* * * * *